United States Patent [19]
Lutzke et al.

[11] Patent Number: 5,241,752
[45] Date of Patent: Sep. 7, 1993

[54] PRUNING TOOL

[75] Inventors: David E. Lutzke, Madison; Ernest D. LaBarre, Waunakee, both of Wis.; Neil L. Brown, Stillman Valley, Ill.

[73] Assignee: Fiskars Oy Ab, Helsinki, Finland

[21] Appl. No.: 919,607

[22] Filed: Jul. 22, 1992

Related U.S. Application Data

[63] Continuation-in-part of Ser. No. 758,957, Sep. 12, 1991, Pat. No. 336,835.

[51] Int. Cl.⁵ ............................................. B26B 13/06
[52] U.S. Cl. ........................................ 30/249; 30/258
[58] Field of Search ................... 30/249, 245, 244, 258

[56] References Cited

U.S. PATENT DOCUMENTS

| | | | |
|---|---|---|---|
| 55,043 | 5/1866 | Baumann | 30/249 |
| 978,574 | 12/1910 | Frumviller | 30/249 |
| 1,338,216 | 4/1920 | Dragus | 30/249 |
| 1,761,469 | 6/1930 | Donkel | 30/249 |
| 2,203,926 | 6/1940 | Porter et al. | 30/249 |
| 2,247,723 | 7/1941 | Chial | 30/249 |
| 2,504,405 | 4/1950 | Fletcher | 30/249 |
| 2,664,628 | 1/1954 | Porter | 30/249 |
| 3,360,858 | 1/1968 | Cowley | 30/249 |
| 3,835,535 | 9/1974 | Robinson et al. | 30/249 |
| 4,096,630 | 6/1978 | Honick | 30/258 |
| 4,649,646 | 3/1987 | Lemcke | 30/231 |
| 4,760,645 | 8/1988 | Davis | 30/249 |

OTHER PUBLICATIONS

Corona Model 1510 (Copy of photographs of Corona Device).

Primary Examiner—Frank T. Yost
Assistant Examiner—Hwei-Siu Payer
Attorney, Agent, or Firm—Foley & Lardner

[57] ABSTRACT

A pole-mounted pruning tool having a shank adapted to support a cutting implement in a disposition suitable for severing a branch or the like. The shank merges into a hook having a jaw. The hook has a slot through which a cutting blade pivots during a pruning operation, the cutting blade cooperating with the jaw to sever a limb to be trimmed. The cutting blade biasing member, which urges the blade into a normally open position outside the bight of the jaw, is substantially received in a recess of the shank so that the pruning tool is less susceptible to becoming caught in congested foliage areas during pruning operations.

13 Claims, 2 Drawing Sheets

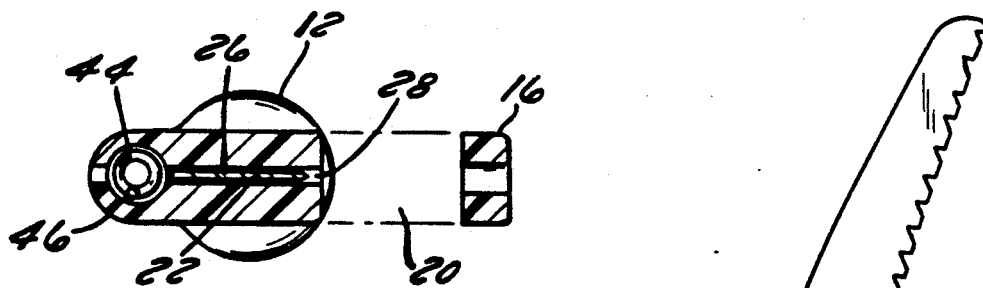
FIG. 3
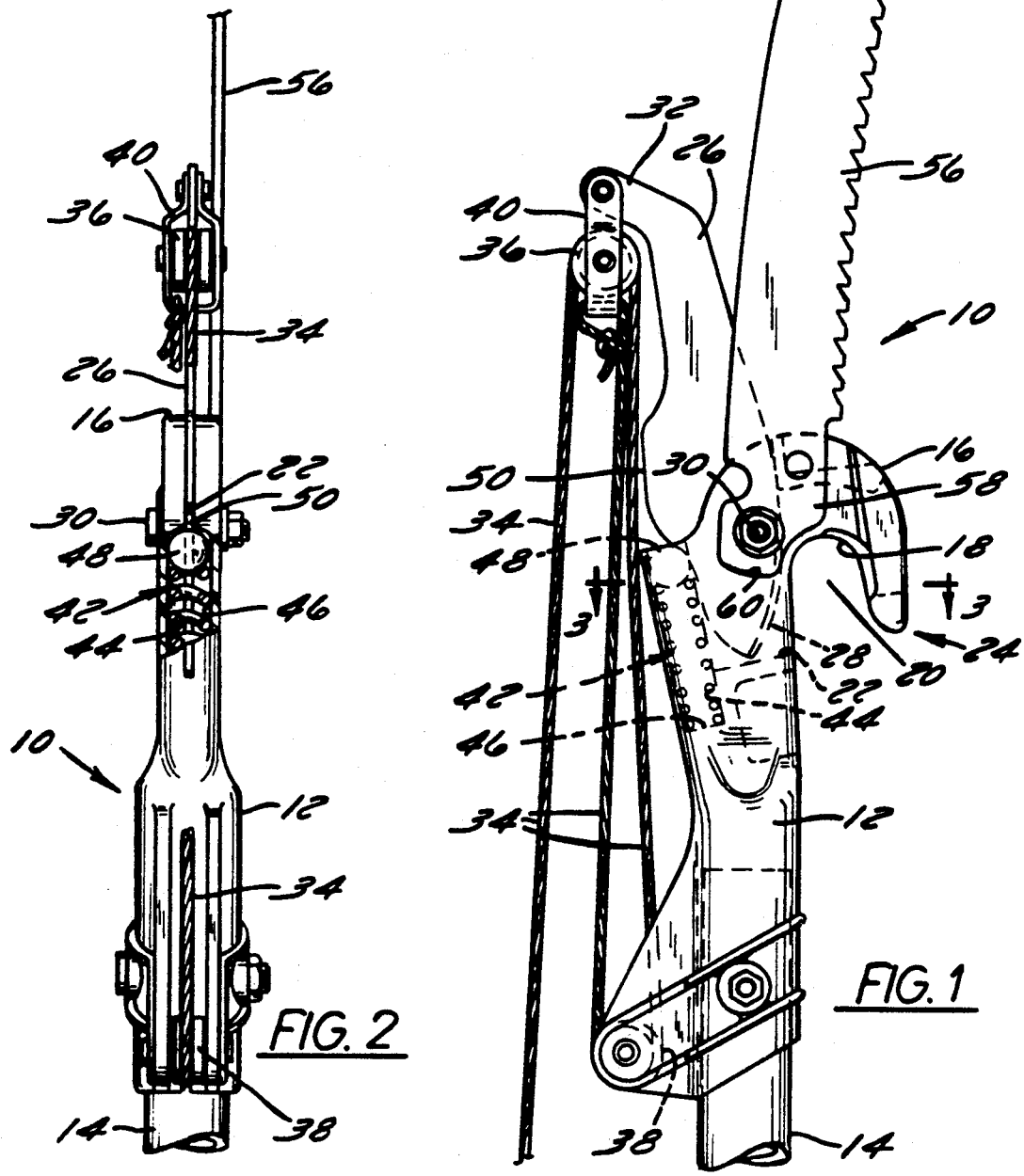
FIG. 2
FIG. 1

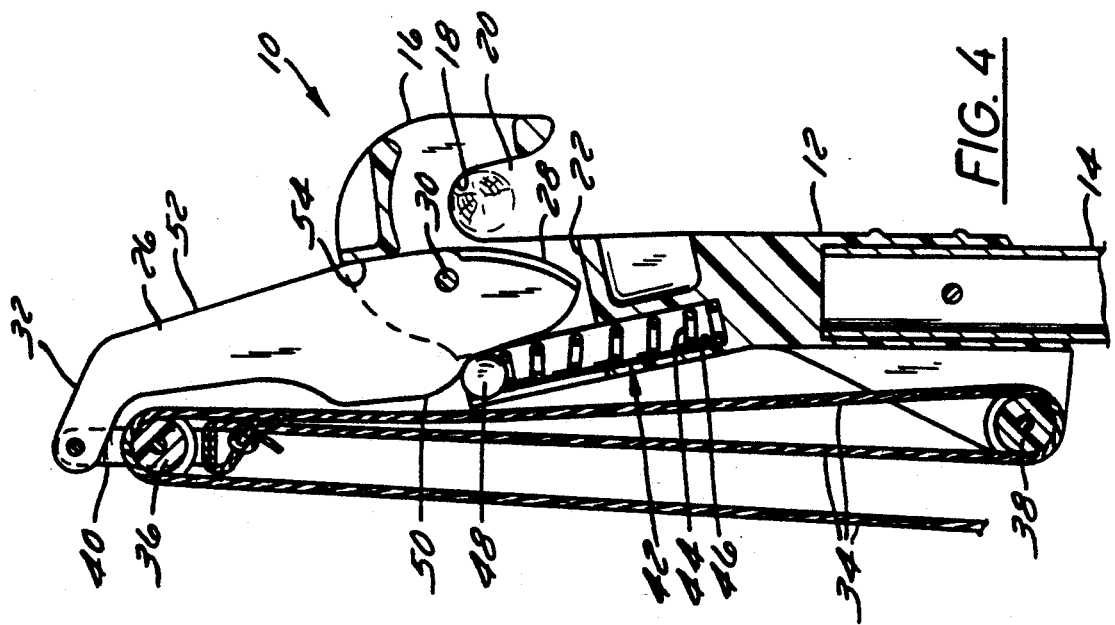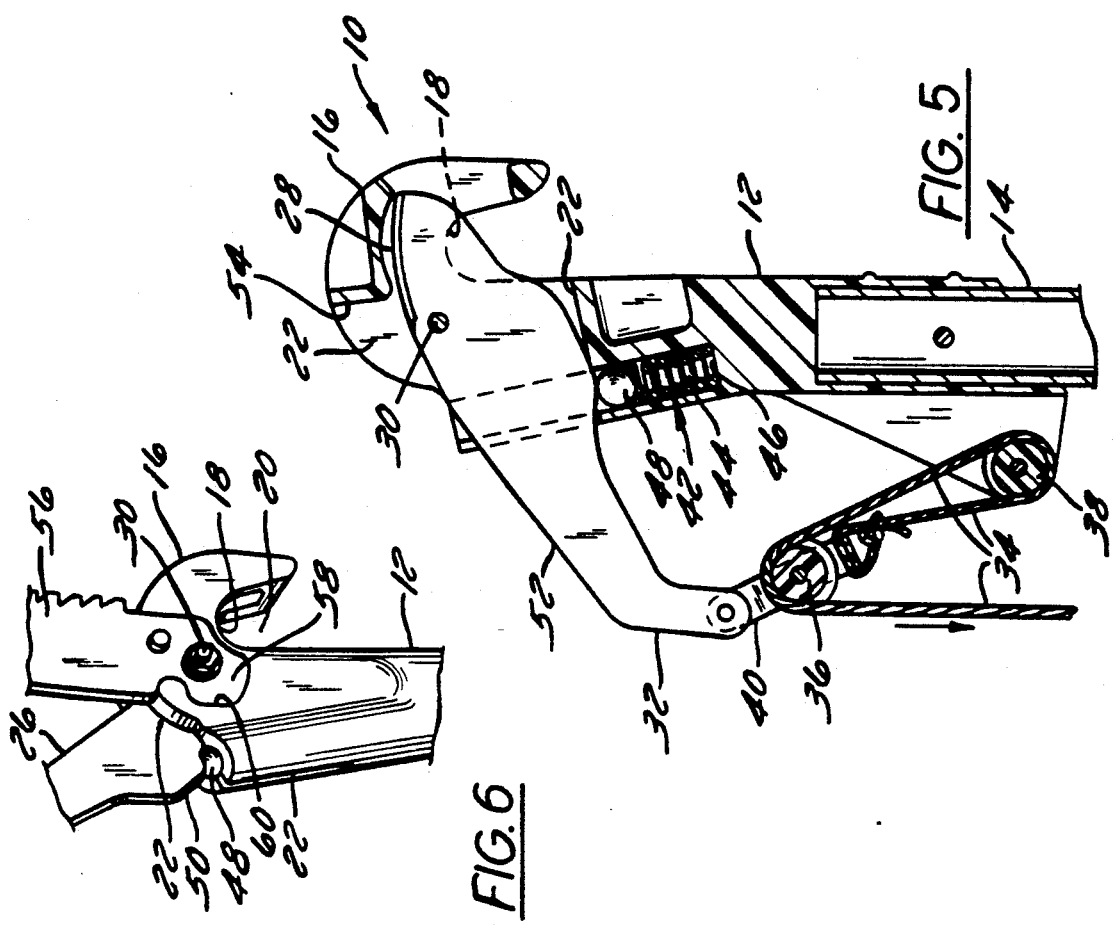

PRUNING TOOL

CROSS REFERENCE TO RELATED APPLICATION

This is a continuation-in-part application from co-pending U.S. patent application Ser. No. 07/758,957 filed Sep. 12, 1991, now U.S. Pat. No. 336,835.

TECHNICAL FIELD

The present invention relates, generally, to cutting tools and, more particularly, to a pole-mounted pruning tool, of the type operated by a pull cord or analogous tensioning member, to trim distant tree branches and the like. Although it will become apparent from the following description that certain features of the invention may be utilized in cutting tools of somewhat different construction for application to other specific uses, for ease of understanding and convenience, the following description, which may be applicable to these other tools, will specifically refer to pole-mounted pruning tools as the most preferred implementation of the present invention.

BACKGROUND OF THE INVENTION

Pole-mounted pruning tools are widely used by those involved in caring for tall trees and plants. To control foliage growth at substantial heights, pruning tools are commonly used by arborists and others involved in landscaping. Conventional tree pruners usually comprise a pruning head mounted atop a pole with the lower section of the pruning head connected to the upper end of the pole. The upper section of the head typically supports the cutting implement which is normally operated by a pull cord or other leverage member extending to the lower end of the pole where it can be easily engaged by the operator.

Such pole-mounted cutting implements usually comprise a jaw having a cutting edge cooperating with a moving blade. As shown in prior art patents such as U.S. Pat. No. 4,760,645 to Davis, these cutting mechanisms typically consists of two pieces of metal passing over each other in a scissorlike action. However, since scissors operate on the principle of shearing to cut material located between the two blades, scissors are more adapted to cut thin material than they are to trim tree branches. This is because, as a cut is being formed in the tree branch held between the two blades, friction results from the pinching of part of the branch held by the blades, thereby reducing the efficiency of the cutting tool.

Pinching and friction problems have already been recognized and addressed by those skilled in the tree trimming art. U.S. Pat. No. 4,096,630 to Honick discloses a pole pruner apparatus designed to provide a solution to the some of these problems. In such a device, the cutting mechanism comprises a cutting blade and an anvil coupled to substantially parallel respective stems. During the trimming operation, the branch to be trimmed is held by the anvil advancing toward the downward moving cutting blade. The cutting force applied by the operator to a pull cord is transmitted through a series of levers to the two stems moving in opposite directions following a linear path. Devices of the type described in the Honick patent, however, necessitate a significant number of parts to translate vertical action on the pull cord into oppositely moving blade and anvil.

Single blade, pass-through cutting implements have also been devised as another way to avoid pinching and friction problems during tree trimming operations. Photographs of the Corona model 1510 tree pruner illustrate an example of a pruning tool using this approach. In such a pole-mounted tool, the cutting blade passes through the area where the branch to be trimmed is disposed. With this tool, as with the blade-anvil device, no pinching of part of the branch being cut occurs. It should be noted, however, that pass-through tree pruners have the advantage over anvil-type tools of requiring fewer parts of lenient tolerances.

Tree pruners also normally include biasing means by which the cutting blade is maintained in an open position, allowing the tree pruner to engage the branch or limb to be trimmed and returning the movable blade to its open position after the trimming operation has been completed. The most commonly used blade return mechanism usually comprises an exposed tension spring linking the cutting blade or blade-actuating lever to the pruning head as shown in the Honick patent and Corona device.

In normal use, tree pruners are usually guided by the operator through areas heavily congested by branches of trees or plants to reach the limb to be trimmed. Accordingly, while tree pruners of the type described above have been used for a great number of years, and while non-scissorlike pole mounted tree pruners are desirable to alleviate the problems associated with various scissor-like pruners, the present inventors have specifically addressed solutions of the problem that the typically exposed return mechanisms of prior art tree pruners usually get caught in the branches of the plants or trees as the operator guides the tool through these branches.

Thus, it is desirable to have a tree pruning tool which can alleviate the problems associated with scissor-like devices and in which the blade return mechanism is disposed so that the tree pruner is less susceptible to getting caught in congested foliage areas, without undesirably affecting the performance of the tool.

SUMMARY OF THE INVENTION

The present invention facilitates the caring of trees and plants growing to substantial heights. When cutting branches or the like with a tree pruner according to the present invention, while the non-scissorlike, pass-through cutting blade avoids pinching and friction problems, the cutting blade biasing mechanism, which is substantially concealed within a recess of the shank of the tree pruner, allows the tree pruner to be operated with increased facility in congested foliage areas. As a result, trimming operations using a device according to the present invention can be effectuated more efficiently and with less guiding effort.

Other advantages of the present invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the present invention will hereinafter be described in conjunction with the appended drawings, wherein like numerals denote like elements, and:

FIG. 1 is a side elevation view of the tree pruner according to the invention;

FIG. 2 is a side view of the tree pruner of FIG. 1, rotated and with portions broken away for clarity;

FIG. 3 is an enlarged sectional view taken along line 3—3 of FIG. 1;

FIG. 4 is a side sectional view of the tree pruner similar to FIG. 1;

FIG. 5 is a view, similar to FIG. 4, showing the tree pruner in its cutting position; and FIG. 6 is a perspective view of a portion of the tree pruner and saw blade assembled to the pruning hook.

DETAILED DESCRIPTION OF A PREFERRED EXEMPLARY EMBODIMENT

The present invention relates to cutting tools useful in pruning branches or the like from a tree, or otherwise useful in managing foliage. Accordingly, as described herein, the use of the term "tree" is also meant to connote other types of flora or vegetation such as bushes, flowers, vines, weeds, vegetables, etc., while use of the term "branch" further comprehends similar foliage including, for example, boughs, limbs, stems, sports, shoots, stalks, etc., whether alive or dead. In this vein, those skilled in the art will further appreciate that the device described herein and its principle of operation are broadly applicable to a wide variety of cutting implements generally and may be adapted to other tools useful in cutting both fibrous and non-fibrous materials. Accordingly, while the present invention is hereinafter described with particular reference to a "tree pruner," the skilled artisan will note its many other applications.

Referring to FIG. 1, a pruning tool in accordance with the present invention, designated generally as 10, is shown to include a shank 12 adapted for attachment at its lower end to an elongate, manually engageable pole 14. The upper end of shank 12 merges into a hook 16 having a jaw 18 forming a bight 20. Bight 20 is disposed intermediate shank 12 and the distal end of hook 16 to engage a limb to be trimmed. A slot 22 is formed in hook 16 and is oriented in a direction congruent with the longitudinal axis of pruning tool 10.

The cutting implement, designated generally as 24, is shown to include a cutting blade 26 having a cutting edge 28 cooperating with jaw 18 to sever the branch to be trimmed. Blade 26, which is disposed in slot 22, is movably connected to hook 16 for pivotal displacement through bight 20 about a pivot point 30. Blade 26 also includes an elongate lever end 32 extending rearwardly from the region of pivot point 30. Lever end 32 is coupled to a cord 34 through a blade actuating mechanism comprising upper and lower sheaves, 36 and 38, respectively. Upper sheave 36 is pivotally connected to lever end 32 by a bracket 40.

To limit the number of parts and thereby reduce manufacturing and assembling costs, shank 12 which merges into hook 16, (the shank merging into the hook being also commonly call the "pruning head") is constructed in one integral piece. Although, in the Corona model 1510 device mentioned above, the pruning head is similarly constructed, it is, however, made of a metal casting. On the other hand, in the preferred embodiment of the present invention, for ease of manufacturing and cost reduction purposes, the pruning head is made of nylon. However, because during trimming operations pruning tool 10 is typically subjected to significant stresses which are more particularly transmitted to pruning tool 10 in the region of pivot point 30, shank 12 is made of fiberglass filled nylon. Moreover, because maximum strength around pivot point 30 is achieved when the fiberglass strands contained in the nylon are aligned with the longitudinal axis of pruning tool 10, the mold cavity used to form shank 12 is filled from the lower end of shank 12 (the end adapted for attachment to pole 14). By this process, the fiberglass strands are disposed around pivot point 30 in a manner offering the greatest resistance to trimming stresses.

Referring now to FIGS. 1 through 5, a substantially concealed cutting blade return mechanism 42 is used to bias blade 26 into an open position when no cutting force is applied by the operator to lever end 32 through cord 34 and sheaves 36 and 38. The mechanism 42 is preferably designed to provide a compressive biasing force on the cutting element to return it to a normally open position. More specifically, cutting blade return mechanism 42 comprises a compression spring 44 lodged in a recess 46 proximate slot 22. Blade return mechanism 42 also includes a ball 48 riding on a cammed edge 50 of blade 26.

When tension on cord 34 is released, ball 48, which is urged substantially upwardly by compression spring 44, causes blade 26 to rotate around pivot 30, as ball 48 rides along cammed edge 50, until the front edge 52 of blade 26 engages a stop 54 disposed within slot 22. (Stop 54 thereby partitions slot 22 into first and second slot openings). As a result, cutting edge 28 of blade 26 clears bight 20 allowing easy engagement by pruning tool 10 of a limb to be trimmed.

Referring now to FIGS. 1 and 6, to provide a pruning tool with additional tree trimming implements, a saw blade 56 is advantageously fixedly coupled to hook 16 at pivot point 30. To prevent rotation of blade 56 during a sawing operation and thereby increase the amount of force that can be applied to pruning tool 10, a tang 58 of saw blade 56 is shaped to match a correspondingly contoured depressed area 60 of hook 16 in which blade 56 is installed.

A pruning tool according to the present invention can therefore be used with increased maneuverability through heavy foliage, as the concealed biasing mechanism is less prone to becoming caught in congested foliage areas, and with increased efficiency as the pass-through action of the cutting blade reduces pinching and friction.

It is understood that the above description is of a preferred exemplary embodiment of the present invention, and that the invention is not limited to the specific forms described. For example, the concealed return mechanism need not be acting upon the lower edge of the cutting blade; the return mechanism may be disposed in a recessed location of the hook to act upon the front edge of the cutting blade. In addition, the return mechanism need not be limited to the cooperation of a compression spring and ball riding on the cammed portion of the blade. These and other substitutions, modifications, changes and omissions may be made in the design and arrangement of the elements without departing from the scope of the appended claims.

We claim:

1. A pruning tool for cutting branches, comprising:

a) a shank having a longitudinal axis, said shank being adapted to support a cutting implement in a disposition suitable for severing a branch, said shank merging into a hook terminating at a distal end, said hook having a jaw with a bight disposed intermediate said shank and said distal end for receiving a branch to be severed;

b) a slot formed in said hook oriented congruent with the longitudinal axis of said shank;

c) a cutting blade disposed within said slot for pivotal movement through said bight, said blade having a cutting edge, a cammed edge and a lever end, said cutting edge cooperating with said jaw for severing the branch;

d) a recess formed in said shank proximate said slot; and e) biasing means for urging said blade into a normally open position outside said bight, said biasing means being disposed substantially within said recess for protection against intrusion of branches during a pruning operation, said biasing means comprising a compression spring and a ball urged by said compression spring into contact with said cammed edge.

2. The pruning tool of claim 1, wherein said slot is a discontinuous slot having an internal stop against which said blade rests while in said normally open position.

3. The pruning tool of claim 2, wherein said stop partitions said slot into first and second slot openings, said blade emerging from said first opening and pivoting into said second opening while passing through said bight during a pruning operation.

4. The pruning tool of claim 2, wherein an actuating force applied to said lever end is translated into pivotal movement of said cutting edge about a pivot point.

5. The pruning tool of claim 4, wherein said pivot point is located proximate said bight.

6. The pruning tool of claim 4, further comprising a saw blade having a tang fixedly coupled to said hook at said pivot point.

7. The pruning tool of claim 6, wherein said tang has a contoured edge and said hook has a correspondingly contoured edge with a depressed area formed therein, wherein said contoured edges conform so that increased sawing force can be imparted to the pruning tool.

8. The pruning tool of claim 4, wherein said shank is made of fiberglass filled nylon, said fiberglass comprising a plurality of strands, said strands being suitably disposed around said pivot point to increase rigidity of said shank at said pivot point.

9. A scissor-like action pruning tool, comprising:

a) a shank adapted to support a cutting implement in a disposition suitable for severing a branch, said shank merging into a hook having a cutting edge defining a limb engaging region;

b) a cutting blade disposed substantially adjacent said limb engaging region and pivotally connected to said hook at a pivot point, said cutting blade having a cutting edge, a lever end, and a cammed edge;

c) a recess formed in said shank proximate said pivot point, said recess having a bore; and d) biasing means within said recess for urging said cutting blade into a normally open position outside the limb engaging region, said biasing means comprising a compression spring and a ball disposed substantially within said bore, said ball being urged by said compression spring into contact with said cammed edge.

10. The pruning tool of claim 9, further comprising a saw blade having a tang fixedly coupled to said hook at said pivot point.

11. The pruning tool of claim 10, wherein said tang has a contoured edge and said hook has a correspondingly contoured edge with a depressed area formed therein, wherein said contoured edges conform so that increased sawing force can be imparted to the pruning tool.

12. A pruning tool for cutting branches, comprising:

a) a shank having a longitudinal axis, said shank being adapted to support a cutting implement in a disposition suitable for severing a branch, said shank merging into a hook terminating at a distal end, said hook having a jaw with a bight disposed intermediate said shank and said distal end for receiving a branch to be severed;

b) a slot formed in said hook oriented congruent with the longitudinal axis of said shank;

c) a cutting blade disposed within said slot for pivotal movement through said bight, said blade having a cutting edge, a cammed edge and a lever end, said cutting edge cooperating with said jaw for severing the branch;

d) a recess formed in said shank proximate said slot; and e) biasing means for urging said blade into a normally open position outside said bight, said biasing means being disposed substantially within said recess, said biasing means comprising a compressive biasing member and a ball urged by said compressive biasing member into contact with said cammed edge.

13. The pruning tool of claim 12, wherein said compressive biasing member is a compression spring.

* * * * *

UNITED STATES PATENT AND TRADEMARK OFFICE
CERTIFICATE OF CORRECTION

PATENT NO. : 5,241,752
DATED : September 7, 1993
INVENTOR(S) : Lutzke et al.

It is certified that error appears in the above-indentified patent and that said Letters Patent is hereby corrected as shown below:

On the Title Page, Item [75]:

"Robert R. Beaudoin" to the list of inventors.

Signed and Sealed this

Nineteenth Day of April, 1994

Attest:

BRUCE LEHMAN

*Attesting Officer*  *Commissioner of Patents and Trademarks*